US010149182B2

(12) United States Patent
Venkataraman et al.

(10) Patent No.: US 10,149,182 B2
(45) Date of Patent: Dec. 4, 2018

(54) DEVICE, SYSTEM, AND METHOD FOR ADVERTISING DEVICE CAPABILITY

(71) Applicant: APPLE INC., Cupertino, CA (US)

(72) Inventors: Vijay Venkataraman, San Jose, CA (US); Srinivasan Nimmala, San Jose, CA (US); Murtaza Shikari, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/453,681

(22) Filed: Mar. 8, 2017

(65) Prior Publication Data

US 2018/0070250 A1  Mar. 8, 2018

Related U.S. Application Data

(60) Provisional application No. 62/384,467, filed on Sep. 7, 2016.

(51) Int. Cl.
*H04W 24/04* (2009.01)
*H04W 72/04* (2009.01)
*H04W 48/08* (2009.01)
*H04W 72/12* (2009.01)
*H04W 72/14* (2009.01)

(52) U.S. Cl.
CPC .......... *H04W 24/04* (2013.01); *H04W 48/08* (2013.01); *H04W 72/0413* (2013.01); *H04W 72/1247* (2013.01); *H04W 72/1284* (2013.01); *H04W 72/14* (2013.01); *H04W 72/048* (2013.01)

(58) Field of Classification Search
None
See application file for complete search history.

(56) References Cited

U.S. PATENT DOCUMENTS

| 9,439,171 B2 | 9/2016 | Phan et al. |
| 9,775,154 B2 * | 9/2017 | Sundar .............. H04W 72/0453 |
| 2013/0114455 A1 * | 5/2013 | Yoo ....................... H04W 24/00 370/252 |

(Continued)

FOREIGN PATENT DOCUMENTS

KR   10-2014-0054247    5/2014

OTHER PUBLICATIONS

GTI, "TD-LTE Carrier Aggregation," white paper, GTI (Feb. 1, 2015) [http://www.gtigroup.org/d/file/Resourees/rep/2015-03-12/b7c4fe87daf37a54ebbOtb 6103a1 d7d2.pdf].

*Primary Examiner* — Ajit Patel
(74) *Attorney, Agent, or Firm* — Fay Kaplun & Marcin, LLP

(57) ABSTRACT

A device and method for transmitting user equipment capability information to a network. In a first mechanism, the device and method transmits carrier aggregation (CA) combinations supported by the user equipment in a priority order to the network. The priority order may be determined based on most recent camped bands and the neighbor bands of the most recent camped bands. In a second mechanism, the device and method transmits indicators corresponding to types of gapless measurements, where when an indicator is set to the user equipment being incapable of performing the type of gapless measurement, the capability message does not include individual indications for the bands for that type of measurement.

20 Claims, 5 Drawing Sheets

(56) References Cited

U.S. PATENT DOCUMENTS

| | | | |
|---|---|---|---|
| 2013/0114508 A1* | 5/2013 | Liang | H04L 5/001 370/328 |
| 2013/0201834 A1* | 8/2013 | Klingenbrunn | H04W 28/12 370/236 |
| 2014/0169343 A1* | 6/2014 | Skov | H04L 5/0007 370/336 |
| 2018/0049200 A1* | 2/2018 | Suzuki | H04W 8/20 |
| 2018/0084549 A1* | 3/2018 | Liu | H04W 72/0453 |

* cited by examiner

Table 400

| Zone A | |
|---|---|
| UE RFB Priority: | 7, 4, 12, 1, 13 |

CA Combination Priority:

| # | CA Combination Type | Combinations |
|---|---|---|
| 425 | PCC | 7 |
| 430 | 4x CA Comb. w/ UE RFBs | 4-12-1, 4-12-13, 4-1-13, 12-1-13 |
| 435 | 3x CA Comb. w/ UE RFBs | 4-12, 4-1, 4-13, 12-1, 12-13, 1-13 |
| 440 | 2x CA Comb. w/ UE RFBs | 4, 12, 1, 13 |
| 445 | 4x CA Comb. w/ All Other Bands | 2-3-5, 2-3-6, 2-3-8, 2-3-9, 2-3-10, 2-3-11, 2-5-6, 2-5-8, 2-5-9, 2-5-10, 2-5-11, 2-6-8, 2-6-9, 2-6-10, 2-6-11, 2-8-9, 2-8-10, 2-8-11, 2-9-10, 2-9-11, 2-10-11, ... |
| 450 | 3x CA Comb. w/ All Other Bands | 2-3, 2-5, 2-6, 2-8, 2-9, 2-10, 2-11, 3-5, 3-6, 3-8, 3-9, 3-10, 3-11, 5-6, 5-8, 5-9, 5-10, 5-11, 6-8, 6-9, 6-10, 6-11, 8-10, 8-11, 9-10, 9-11, 10-11 |
| 455 | 2x CA Comb. w/ All Other Bands | 2, 3, 5, 6, 8, 9, 10, 11 |
| 460 | PCC | 4 |
| 465 | 4x CA Comb. w/ UE RFBs | 7-12-1, 7-1-13, 7-12-13, 12-1-13 |
| 470 | 3x CA Comb. w/ UE RFBs | 7-12, 7-1, 7-13, 12-1, 12-13, 1-13 |
| 475 | 2x CA Comb. w/ UE RFBs | 7, 12, 1, 13 |
| 480 | 4x CA Comb. w/ All Other Bands | 2-3-5, 2-3-6, 2-3-8, 2-3-9, 2-3-10, 2-3-11, 2-5-6, 2-5-8, 2-5-9, 2-5-10, 2-5-11, 2-6-8, 2-6-9, 2-6-10, 2-6-11, 2-8-9, 2-8-10, 2-8-11, 2-9-10, 2-9-11, 2-10-11, ... |
| 485 | 3x CA Comb. w/ All Other Bands | 2-3, 2-5, 2-6, 2-8, 2-9, 2-10, 2-11, 3-5, 3-6, 3-8, 3-9, 3-10, 3-11, 5-6, 5-8, 5-9, 5-10, 5-11, 6-8, 6-9, 6-10, 6-11, 8-10, 8-11, 9-10, 9-11, 10-11 |
| 490 | 2x CA Comb. w/ All Other Bands | 2, 3, 5, 6, 8, 9, 10, 11 |

DEVICE, SYSTEM, AND METHOD FOR ADVERTISING DEVICE CAPABILITY

PRIORITY INFORMATION/INCORPORATION BY REFERENCE

This application claims priority to U.S. Provisional Application 62/384,467 entitled "Device, System, and Method for Advertising Device Capability," filed on Sep. 7, 2016, the entirety of which is incorporated herein by reference.

BACKGROUND INFORMATION

A user equipment (UE) may be configured with a variety of different capabilities. For example, the UE may be capable of establishing a connection with a wireless network. Specifically, the UE may connect to a Long Term Evolution (LTE) network. While connected to the LTE network, the UE may utilize further network capabilities. For example, the UE may utilize a carrier aggregation (CA) functionality in which a primary component carrier (PCC) and at least one secondary component carrier (SCC) are used to communicate data over the various LTE bands. To utilize the CA functionality, the UE is required by LTE standards to advertise the combinations of PCC and SCCs that are supported by the UE. However, with an increasing number of LTE bands and a limited number of combinations that are allowed to be advertised, the advertising process is inefficient, particularly as a double CA arrangement (1 PCC and 1 SCC) must first be advertised prior to any triple CA arrangement (1 PCC and 2 SCCs), although the triple CA arrangement may be preferable.

Furthermore, the capabilities of the UE may be requested by the LTE network. However, the uplink (UL) grant size for the UE to transmit the capability information has limited space. This capability information may include the CA advertisements included above and measurement information for the various LTE bands. These measurements may be provided so that the LTE network may be aware of the optimal CA arrangement available for use by the UE. However, other capability information may also be included in the UL grant. For example, gapless measurement capability information may be provided. The gapless measurement capability encompasses the available bands over LTE bands, different radio access technology (RAT) bands, and the CA combinations. Thus, the gapless measurement capability information may occupy a significant portion of the limited space of the UL grant indicating the capabilities of the UE.

If the UL grant is too small for all the UE capability information to be provided, this may lead to various failures and unsatisfactory user experiences such as network timeouts and attach failures.

SUMMARY

A method performed by a user equipment. The method includes determining a number of available spots to advertise carrier aggregation (CA) combinations to a network, determining a priority order for a plurality of bands that are part of the CA combinations, determining a list of the CA combinations based on the priority order and transmitting a portion of the list of the CA combinations in the priority order to the network, wherein the portion corresponds to the number of available spots.

A user equipment having a transceiver configured to connect the user equipment to a network, the user equipment and the network configured for a carrier aggregation (CA) functionality. The user equipment also having a processor determining a number of available spots to advertise CA combinations to the network, the processor determining a priority order for a plurality of Long Term Evolution (LTE) bands that are part of the CA combinations, the processor determining a list of the CA combinations based on the priority order, wherein the transceiver transmits a portion of the list of the CA combinations in the priority order to the network, wherein the portion corresponds to the number of available spots.

An integrated circuit having circuitry to determine a number of available spots to advertise carrier aggregation (CA) combinations to a network, circuitry to determine a priority order for a plurality of bands that are part of the CA combinations, circuitry to determine a list of the CA combinations based on the priority order and circuitry to determine a portion of the list of the CA combinations in the priority order that is to be transmitted to the network, wherein the portion corresponds to the number of available spots.

A further method performed by a user equipment that includes a transceiver configured to communicate with a network. The method includes determining whether the transceiver is configured to perform predetermined types of gapless measurements, setting a corresponding indicator for each type of gapless measurement based on whether the transceiver is capable of performing the type of gapless measurement, in response to a network request for a capability of the user equipment, transmitting a message to the network including the corresponding indicators and in response to a subsequent network request for the capability of the user equipment, transmitting a further message to the network that omits the corresponding indicators for the types of gapless measurements that the transceiver is incapable of performing.

A user equipment having a transceiver configured to configured to communicate with a network. The user equipment also having a processor determining whether the transceiver is configured to perform predetermined types of gapless measurements and setting a corresponding indicator for each type of gapless measurement based on whether the transceiver is capable of performing the type of gapless measurement. The transceiver, in response to a network request for a capability of the user equipment, transmits a message to the network including the corresponding indicators and in response to a subsequent network request for the capability of the user equipment, transmits a further message to the network that omits the corresponding indicators for the types of gapless measurements that the transceiver is incapable of performing.

An integrated circuit having circuitry to determine whether a transceiver is configured to perform predetermined types of gapless measurements, circuitry to set a corresponding indicator for each type of gapless measurement based on whether the transceiver is capable of performing the type of gapless measurement, circuitry to generate a message in response to a network request for a capability of a user equipment, the message including the corresponding indicators and circuitry to generate a further message in response to a subsequent network request for the capability of the user equipment, the further message omitting the corresponding indicators for the types of gapless measurements that the transceiver is incapable of performing.

BRIEF DESCRIPTION OF THE DRAWINGS

FIG. 4 shows a table listing prioritized carrier aggregation combinations for advertisement according to the exemplary embodiments.

DETAILED DESCRIPTION

Figure 1:
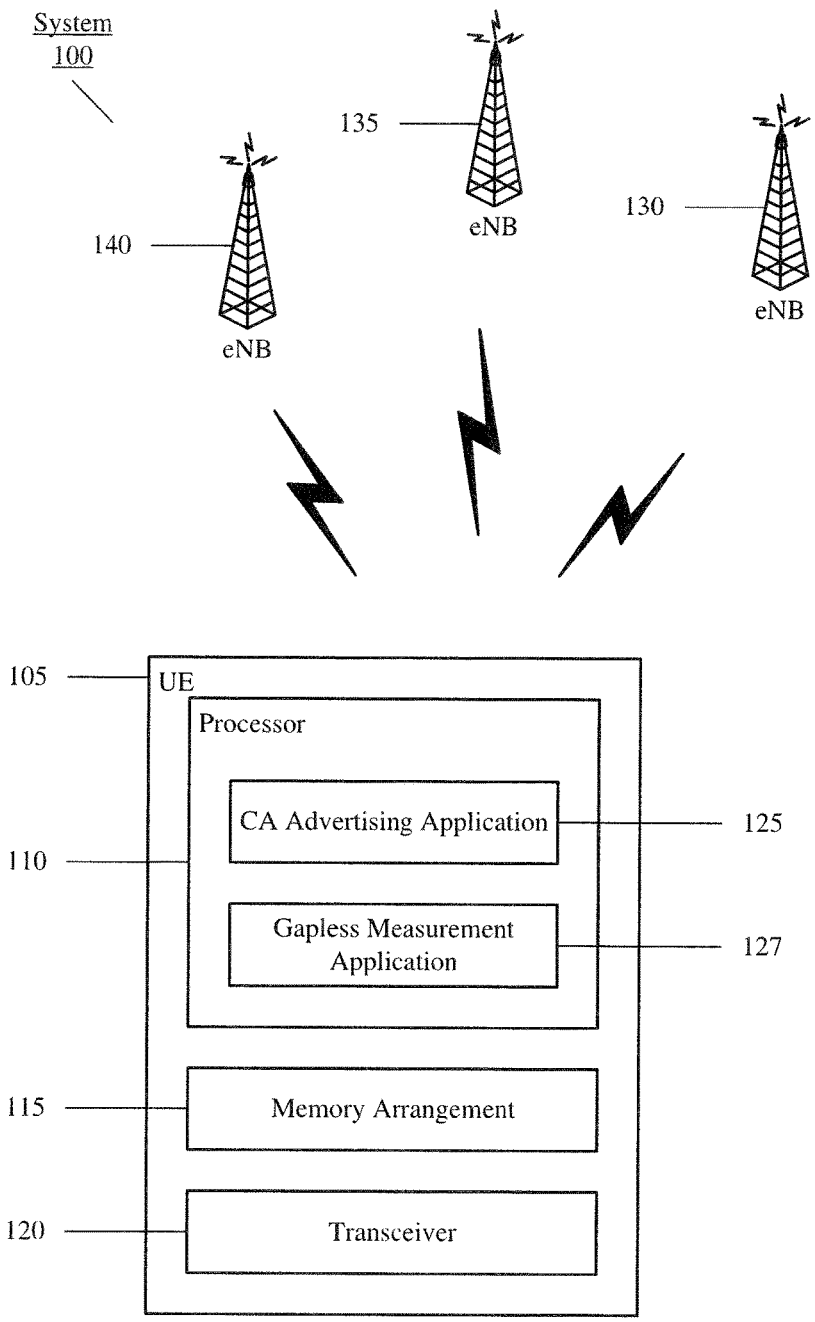
FIG. 1 shows a system where a user equipment modifies advertisement of network capabilities according to various exemplary embodiments described herein.

The exemplary embodiments may be further understood with reference to the following description and the related appended drawings, wherein like elements are provided with the same reference numerals. The exemplary embodiments are related to a device, system, and method for advertising device capabilities of a user equipment (UE) to a network to which the UE is connected. Specifically, the network may be a Long Term Evolution (LTE) network and the network capabilities that are being advertised may relate generally to the UE capabilities and also more specifically to a carrier aggregation (CA) capability where the CA functionality may include a primary serving cell (PCell) and at least one secondary serving cell (SCell). The exemplary embodiments provide a first mechanism for the UE that has the CA functionality enabled with a network to advertise selected CA combinations that will efficiently indicate the CA capability to the network. The exemplary embodiments provide a second mechanism for the UE to transmit an initial indication of UE capabilities that allows subsequent capability information to be transmitted in an efficient manner.

The UE may associate with a network component which serves as the PCell. With a LTE network, the network component may be an evolved Node B (eNB). The PCell may control the manner in which the data is exchanged with the UE such as determining when uplink and downlink grants are given for the UE. The PCell may also control the mechanism used in exchanging data, particularly how data is transmitted to and received by the UE. When the UE is CA capable, CA functionality enables the PCell and a further SCell to combine bandwidths to exchange data with the UE. The SCell may also be configured and activated by the eNB based on throughput requirements. Thus, with CA, the PCell may provide a first portion of a total bandwidth for data to be exchanged while the SCell may provide a second portion of the total bandwidth. A PCell and a single SCell may be termed a double CA combination (two carriers) and may be utilized to provide the total available bandwidth. To further increase the total available bandwidth for data to be exchanged with the UE, an additional SCell may be incorporated. A PCell and two SCells may be termed a triple CA combination and may be utilized to provide the total available bandwidth. A PCell and three SCells may be termed a quadruple CA combination and may also be utilized to provide the total available bandwidth. The exemplary embodiments are described with regard to double, triple and quadruple CA combinations. However, those skilled in the art will understand that the exemplary embodiments may be modified for the PCell and any number of SCells to be used in the CA functionality.

Those skilled in the art will understand that the CA functionality is controlled by the eNB serving as the PCell for the UE. For example, upon detection that the UE is CA capable and a rate of transmission to the UE is under a maximum possible rate of transmission, the eNB may enable the CA functionality. The SCells may be selected and used for any data exchange. In selecting the SCells, the UE may perform measurements of the LTE bands to determine a quality of the CA combinations. The LTE Specification Release 11 TS 36.331 (e.g., 3GPP TS 36.331 V.11.0.0 and later) requires that the UE advertise all supported CA combinations. Thus, the UE may perform the measurements for all available CA combinations and advertise the corresponding qualities. The LTE Specification also indicates that the UE is only allowed to advertise a maximum of 128 CA combinations. Thus, there is a 128 CA combination limit to the total number of CA combinations in an existing CA container in which the UE may advertise. In current implementations, the UE may first advertise all available double CA combinations. If all the available double CA combinations number less than the maximum limit, the triple CA combinations may then be advertised and then the quadruple CA combinations if there is any advertising space left. However, there may be instances when the double CA combinations alone number more than 128. For example, depending on the provider, there may be 13 LTE bands that are available. Accordingly, the double CA combinations may number up to 169. Thus, the UE risks missing any advertising of the triple or quadruple CA combinations capability to the network even though the triple or quadruple CA combinations are supported both by the UE and the PCell. In fact, the UE also risks missing any advertising on possibly higher quality double CA combinations capability.

FIG. 1 shows a system 100 where a UE modifies advertisement of network capabilities according to the various exemplary embodiments described herein. The system 100 includes a UE 105 and a plurality of eNBs 130, 135, 140. As discussed above, the UE 105 may associate with one of the eNBs 130-140 such as the eNB 130 to join the network corresponding to the eNB 130 such as a LTE network. The UE 105 and the eNBs 130-140 may also include the CA functionality that may be enabled and controlled by the eNB 130. As the UE 105 is associated with the eNB 130, the eNB 130 may provide the CA configuration for component carriers to be used by the UE 105 in which the eNB 130 may be the PCell and the eNBs 135, 140 may serve as the SCells.

The UE 105 may be any electronic component configured to join a network via the eNB 130. For example, the UE 105 may be a portable device such as a cellular phone, a smartphone, a tablet, a phablet, a laptop, a wearable, etc. In another example, the UE 105 may be a stationary device such as a desktop terminal. The UE 105 may also operate on a variety of different frequencies or channels (i.e., range of continuous frequencies). Accordingly, the UE 105 may include components that enable different radio access technologies. As shown in FIG. 1, the UE 105 may include a processor 110, a memory arrangement 115, and a transceiver 120. However, the UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. More specifically, the data may be exchanged using the CA functionality to increase a rate in which the data is exchanged. In another example, the applications may include a CA advertising application 125 that is configured to determine how the CA combinations are advertised to the network. As will be described in further detail below, the CA advertising application 125 may initially determine the features of the LTE Specification supported by the PCell. The CA advertising application 125 may subsequently define which of the CA combinations are to be advertised when an advertising opportunity remains. In a further example, the applications may include a gapless measurement (GM) application 127 that is configured to set indicators for different types of GMs that the UE is currently configured to perform.

It should be noted that the above noted applications being an application (e.g., a program) executed by the processor 110 is only exemplary. The applications may also be represented as components of one or more multifunctional programs, a separate incorporated component of the UE 105 or may be a modular component coupled to the UE 105, e.g., an integrated circuit with or without firmware. In addition, in some UEs, the functionality described for the processor 110 is split among two processors, a baseband processor and an applications processor. The exemplary embodiments may be implemented in any of these or other configurations of a UE.

The memory arrangement 115 may be a hardware component configured to store data related to operations performed by the UE 105. Specifically, the memory arrangement 115 may store measurements or qualities associated with different CA combinations.

Figure 2:
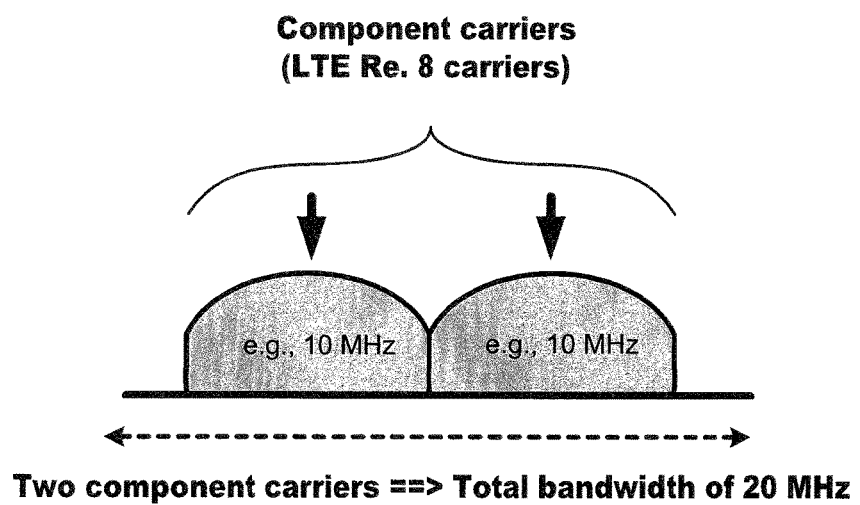
FIG. 2 shows an example of carrier aggregation.

Using the CA functionality, the eNB 130 may serve as the PCell while the eNBs 135, 140 may serve as at least one of the SCells. FIG. 2 shows an example of carrier aggregation. As shown in FIG. 2, the PCell may provide a first component carrier of 10 MHz representing a primary component carrier (PCC) operating on a first LTE band while the SCell may provide a second component carrier of 10 MHz representing the secondary component carrier (SCC) operating on a second LTE band. Also shown in FIG. 2 is one type of carrier aggregation. Specifically, FIG. 2 shows the two component carriers in an intra-band carrier aggregation with continuous component carriers. However, those skilled in the art will understand that other types of carrier aggregation may also be used such as intra-band carrier aggregation with non-continuous component carriers, inter-band carrier aggregation, or any combination of these three types. Furthermore, those skilled in the art will understand that other bandwidths may be used such as 1.4, 3, 5, 15, or 20 MHz and typically a maximum of five component carriers may be aggregated. Again, when only one SCell is utilized, a double CA combination arrangement may be used whereas when two SCells are utilized, a triple CA combination arrangement may be used. As illustrated in FIG. 2, two component carriers each having a bandwidth of 10 MHz may be combined for a total bandwidth of 20 MHz. In a specific example, with carrier aggregation features enabled, the LTE-Advanced standard device supporting 20 MHz carrier aggregation may achieve downlink ("DL") throughput of 100 Mbps (when the maximum of five component carriers are aggregated). In another example, a theoretical maximum closer to 150 Mbps may be achieved such as with only two 10+10 carriers aggregated.

It should be noted that the network shown in the system 100 is only exemplary. For example, the number of eNBs 130-140 that may be in communicative range of the UE 105 may be more or fewer than three. Those skilled in the art will also understand that there may be any number of other types of networks that may also be in communicative range of the UE 105 and that the UE 105 may also be configured to establish connections therewith. That is, the UE 105 may also connect using different radio access technologies (RATs). For example, the system 100 may further include a legacy radio access network (e.g., CDMA, GSM, etc.), a wireless local area network, a WiFi network, etc. If configured for such a capability, the CA functionality may even be used between other types of networks. However, for exemplary purposes, the CA functionality is described herein with regard to the LTE network and the component carriers being provided by the eNBs 130-140. However, it should be understood that the exemplary embodiments may be used in conjunction with any network that implements CA or an analogous functionality.

As described above, the advertising involved with CA combinations such that the CA functionality may be used is a limited operation. In the present example, only up to 128 different CA combinations may be advertised to the network even when the total number of CA combinations well exceeds this maximum limit. It should be noted that the LTE Specification Release 11 TS 36.331 also provides another feature which supports an additional 256 CA combinations on top of the already existing CA combinations. However, these additional 256 CA combinations are only supported when the network to which the UE 105 is connected supports the noted feature. The feature may be a requested frequency band (RFB) feature in which the network indicates a set of LTE bands that are to be prioritized in the CA combination advertisement by the UE 105. More specifically, the set of LTE bands may be for the double CA combination arrangements. Thus, the UE 105 prioritizes the double CA combinations that include the requested LTE bands. However, when the network does not support this RFB feature and the UE 105 is requested to advertise the CA combinations, the UE 105 may advertise all the available double CA combinations that are supported with no priority assigned to an ordering of the double CA combinations.

Given the manner in which CA combinations are advertised by the UE 105, the exemplary embodiments provide a first mechanism in which a UE based solution is provided in which the UE is capable of advertising the most relevant CA combinations within the 128 combination maximum limit. In fact, the first mechanism may override certain restrictions such as advertising all double CA combinations prior to advertising any triple CA combinations. Thus, the most relevant CA combinations may be advertised using the first mechanism of the exemplary embodiments and may include double CA combinations, triple CA combinations and quadruple CA combinations, despite not all double CA combinations being advertised. In this manner, the CA advertising application 125 may perform a set of operations to properly advertise CA combinations. As the first mechanism according to the exemplary embodiments is a UE based solution, the operations of the network may remain unchanged and the network may continue to operate under defined parameters. Specifically, if configured properly, the network may still utilize the RFB feature and the first mechanism of the exemplary embodiments may accommodate the RFB feature to allow the UE 105 to respond appropriately to the RFB feature when invoked by the network.

The CA advertising application 125 may initially determine whether the network is utilizing the RFB feature. For example, the network may request that the UE 105 advertise the CA combinations that the UE 105 is capable of utilizing. Without the RFB feature, the UE 105 may select the CA combinations for advertisement. In this manner, without the RFB feature, the UE 105 may advertise up to the maximum 128 CA combinations. Using the first mechanism of the exemplary embodiments, the UE 105 may create a list of LTE bands based on a priority order as determined by the CA advertising application 125. In one exemplary embodiment, the UE 105 may prioritize the CA combinations in the order of quadruple CA combinations, triple CA combinations and then double CA combinations. This type of prioritization will prioritize higher throughputs for the UE based on the fact that using four carriers will generally result in a higher throughput than three carriers or two carriers. However, other manners of prioritizing the CA combinations may also be used. As this operation selects LTE bands by the UE 105, the LTE bands selected by the UE 105 will be referred to as UE RFBs.

The priority upon which the UE 105 orders the LTE bands may be further based on a variety of factors. For example, the CA advertising application 125 may prioritize a time parameter where a highest priority is given to a LTE band that was most recently camped on by the UE 105. The CA advertising application 125 may then prioritize a neighbor parameter where a next highest priority is given to neighbors of the LTE band that was most recently camped on by the UE 105. The neighbor parameter may be based on the SIB-5 inter-frequency neighbor information. The CA advertising application 125 may continue to prioritize the LTE bands using the time parameter again in which the next highest priority is given to a second most recently camped LTE band. The CA advertising application 125 may then utilize the neighbor parameter to prioritize the neighbors of the second most recently camped LTE band. In this manner, the CA advertising application 125 may prioritize the LTE bands based on the time parameter and the neighbor parameter. Furthermore, the CA advertising application 125 may also update the priority order based on knowledge of cellular carrier deployment gathered by historical data harvesting. Again, based on the provider, there may be up to 16 LTE bands. Thus, this list may be continued until a maximum of 16 LTE bands is reached for the UE RFBs.

In an exemplary list that is created using the first mechanism of the exemplary embodiments, the first set of CA combinations to be advertised may be all quadruple CA combinations that have the highest priority LTE band in the UE RFBs as the PCC while the three SCCs may be any LTE band in the UE RFBs (with priority to the higher priority LTE bands in the UE RFBs). As noted above, the highest priority LTE band may be the most recently camped LTE band. The second set of CA combinations to be advertised may be all triple CA combinations that have the highest priority LTE band in the UE RFBs as the PCC while the other two SCCs may be any LTE band in the UE RFBs. The third set of CA combinations to be advertised may be all double CA combinations that include the highest priority LTE band in the UE RFBs as the PCC while the SCC may be any LTE band in the UE RFBs. The fourth set of CA combinations may be all other CA combinations that include the highest priority LTE band in the UE RFBs as the PCC as the only requirement. That is, in the example of the fourth set of CA combinations, there is no condition that the SCCs are in the UE RFBs. It is noted that an example of the UE RFB selection and the corresponding CA combinations will be provided below with regard to FIG. 4.

The exemplary list may continue such that the fifth set of CA combinations to be advertised may be all quadruple CA combinations that have the second highest priority LTE band in the UE RFBs as the PCC while the three SCCs may be any LTE band in the UE RFBs (with priority to the higher priority LTE bands in the UE RFBs). As noted above, the second highest priority LTE band may be a neighbor of the most recently camped LTE band. The sixth set of CA combinations to be advertised may be all triple CA combinations that have the second highest priority LTE band in the UE RFBs as the PCC while the other two SCCs may be any LTE band in the UE RFBs. The seventh set of CA combinations to be advertised may be all double CA combinations that include the second highest priority LTE band in the UE RFBs as the PCC while the SCC may be any LTE band in the UE RFBs. The eighth set of CA combinations to be advertised may be all other CA combinations that include the second highest priority LTE band in the UE RFBs as the PCC as the only requirement.

In this manner, the exemplary list may continue until 128 different CA combinations are advertised to the network. Using this methodology, the UE 105 may be configured to advertise the most relevant CA combinations for use by the network. That is, less relevant CA combinations that have a low or near zero probability of being used may be eliminated from being advertised. Therefore, the probability that the more relevant CA combinations being advertised increases significantly.

It is noted that the list of UE RFBs may be dependent on a variety of factors. For example, the list may be dynamic or different based on the current factors experienced by the UE 105. Thus, the UE 105 may store a plurality of UE RFBs that may be utilized dependent on these factors. For example, the UE 105 may dynamically modify the UE RFBs if there is knowledge that a particular LTE band may be unavailable. Thus, the LTE band may be removed from the UE RFBs when creating the list of relevant CA combinations. In another example, the factor may be a location. When the UE 105 is disposed at a first location, the UE 105 may utilize a first list of UE RFBs. However, when the UE 105 is disposed at a second location (e.g., a significant distance from the first location), the UE 105 may utilize a second list of UE RFBs that is different from the first list of UE RFBs. In fact, the location may change while the UE 105 is connected to the network. As the list of UE RFBs may change from this movement (e.g., a new neighbor being added, an old neighbor being deleted, etc.), the UE 105 may set a flag such as in a tracking area update. When the network initiates a tracking area update for the UE 105, the flag may indicate that the UE 105 should update the CA combinations to be advertised. Accordingly, the UE 105 may advertise the LTE bands prioritized in the new, updated, or different UE RFBs.

The above process of populating the relevant CA combinations using the first mechanism of the exemplary embodiments relates to when the network does not impose any criteria and the UE 105 is allowed to fill all 128 spots in the available CA combination list. However, the network may include selected LTE bands in the request as part of the RFB feature noted above as defined in the LTE Specification Release 11 TS 36.331. As will be used herein, the LTE bands selected by the network in the RFB feature will be referred to as NW RFBs.

When the network is configured with the RFB feature and transmits the NW RFBs to the UE 105, the additional 256 CA combinations may also be used. As the network RFB feature may be an overriding feature, the UE 105 may respond to the advertisement request by first advertising the CA combinations that satisfy the NW RFBs. For example, the UE 105 may determine all CA combinations that include the NW RFBs, i.e., the CA combinations that are currently supported by the UE 105 and are also included in the list of NW RFBs received by the UE 105. After the list of supported CA combinations that correspond to the NW RFBs have been determined, the CA advertising application 125 may determine whether there are any remaining spots in the 128 available advertisement spots for the CA combinations. For example, the NW RFBs may only require that 40 CA combinations be advertised. Thus, there may still be 88 available spots to be used in advertising further CA combinations. Under this scenario when at least one available spot is determined after using the NW RFBs, the first mechanism of the exemplary embodiments may again be utilized to fill the remaining available spots. Thus, a substantially similar operation as described above may be used. It is noted that any redundant CA combination from those associated with the NW RFBs may be omitted from the UE RFB analysis.

Figure 3:
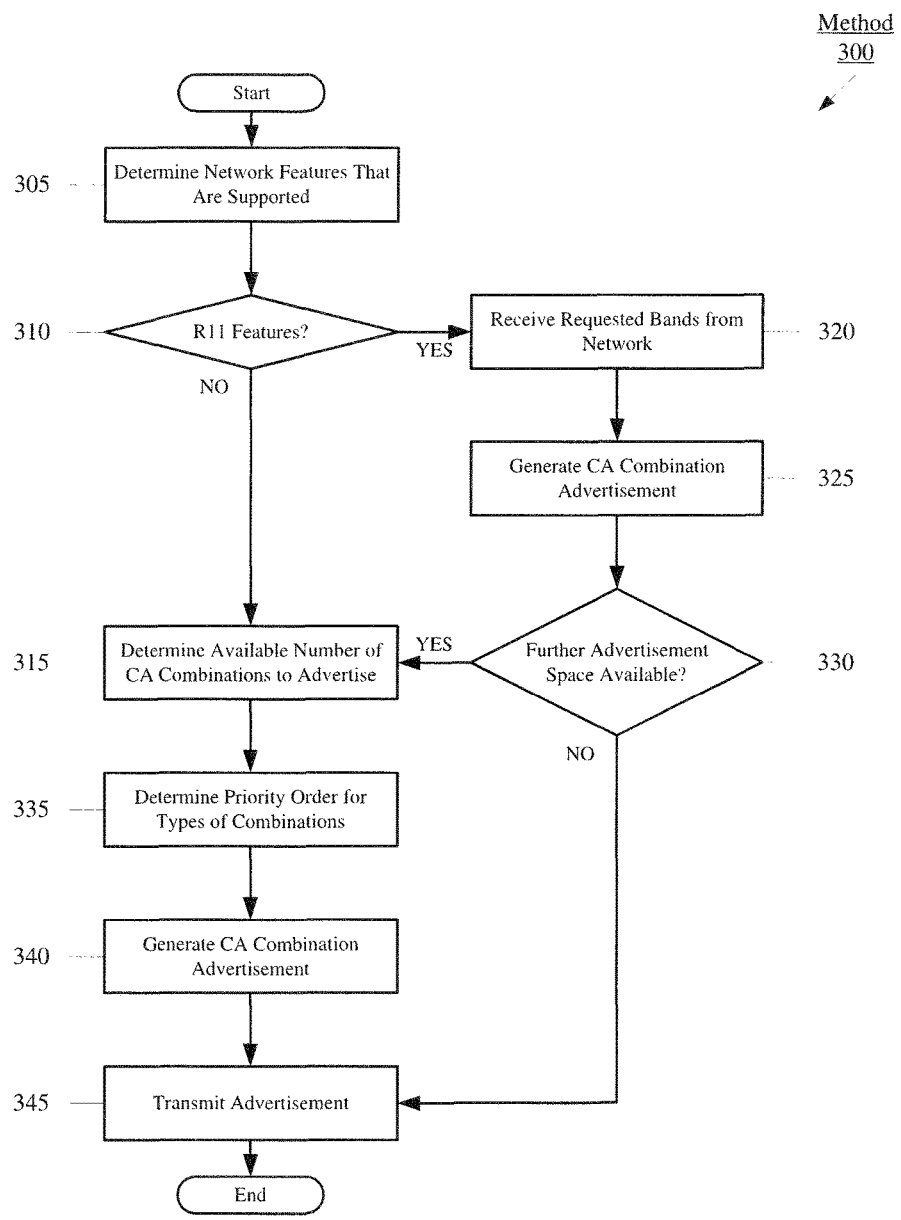
FIG. 3 shows a method for advertising a carrier aggregation functionality according to various exemplary embodiments described herein.

FIG. 3 shows a method 300 for advertising a carrier aggregation functionality according to the exemplary embodiments. The method 300 may relate to the first mechanism of the exemplary embodiments in which the UE 105 determines the CA combinations that are to be advertised based on predetermined criteria. As discussed above, the advertising of CA combinations may be initiated as a network operation. However, after following requests from the network, the UE 105 may select the CA combinations to advertise if there is available space for advertising after the requests from the network. Thus, the method 300 is performed by the UE 105 and the method 300 will be described with regard to the system 100 of FIG. 1.

As noted above, an example of the first mechanism will also be described. The example will be described within the context of the method 300. The example is illustrated in FIG. 4 which shows a table 400 listing prioritized carrier aggregation combinations for advertisement according to the exemplary embodiments. Initially, it may be assumed that the UE 105 is in a particular area to which the table 400 may be utilized. As shown, a location 405 is indicated for the table 400 which is to be used while the UE 105 is in the location 405. However, if the UE 105 is in a different location, a further table may be stored and utilized.

In 305, the UE 105 determines the features supported by the network to which the UE 105 is connected. Although there may be any number of features that the network may or may not support, the method 300 is described with regard to LTE Specification Release 11 features. Specifically, the LTE Specification Release 11 feature may be the RFB feature in which NW RFBs are selected by the network in an advertisement request to the UE 105. Thus, in 310, the UE 105 determines whether the RFB feature is supported by the network. If the RFB feature is not supported by the network, the UE 105 continues the method 300 to 315. In 315, the UE 105 determines the available number of CA combinations that may be advertised. With no requirements from the network, the UE 105 may determine that the full 128 spots are available for advertisement of CA combinations.

Returning to 310, if the RFB feature is supported, the UE 105 continues the method 300 to 320. In 320, the UE 105 receives the requested LTE bands from the network. That is, the NW RFBs are received from the network. Based on the NW RFBs, in 325, the UE 105 generates the advertisement corresponding to the CA combinations that include the NW RFBs. In 330, the UE 105 determines whether there is any remaining space available to advertise further CA combinations. As noted above, the UE 105 may advertise up to 384 CA combinations (128 CA combinations and an additional 256 combinations) when the RFB feature is supported by the network (otherwise 128 CA combinations when the RFB feature is not supported by the network). It should be noted that the number of available advertising spots is only exemplary and is based on current LTE standards, the number may change over time as the LTE standards evolve and other types of networks may utilize other numbers of advertising spots. The exemplary embodiments are not limited to any particular number of advertising spots and may be implemented on networks having any number of advertising spots. If the CA combinations using the NW RFBs consumes the entirety of the available spots, the UE 105 continues the method 300 to 340. In 345, the UE 105 transmits the advertisement to the network which includes only the CA combinations based on the NW RFBs. However, if there is at least one spot available for a further CA combination, the UE 105 continues the method 300 to 315 to determine the number of available spots.

In 335, the UE 105 determines a priority order for the types of CA combinations. That is, the UE RFBs may be determined. For example, a highest priority LTE band may be a most recently camped LTE band. A second highest priority LTE band may be a neighbor to the highest priority LTE band. A third highest priority LTE band may be a next most recently camped LTE band. A fourth highest priority LTE band may be a neighbor to the next most recently camped LTE band. This priority list may continue until all LTE bands are listed. In 340, the UE 105 may generate the advertisement for the CA combinations in which the UE RFBs may be included after any NW RFB. In 345, the UE 105 transmits the advertisement to the network.

In a specific example in which the UE RFBs are determined and the CA combinations are also determined, the table 400 shows when the UE 105 is in the location 405 (e.g., Zone A) in which the UE RFBs are prioritized with an order 415 as LTE bands 7, 4, 12, 1, and 13. As described above, the order 415 may prioritize the LTE band having an earliest timing parameter, followed by the LTE band(s) that are identified as neighbors to the highest priority LTE band, followed by the LTE band having a next earliest timing parameter, followed by the LTE band(s) that are identified as neighbors to the next highest priority LTE band, and continue along this sequence. For example, the LTE band 7 may represent a highest priority LTE band. Specifically, the LTE band 7 may be the most recent LTE band on which the UE 105 has camped. Thus, the LTE band 7 may be the first UE RFB in the order 415. The LTE bands 4 and 12 may represent neighbor LTE bands to the LTE band 7. Accordingly, the UE RFBs may prioritize the LTE bands 4 and 12 as second and third in the order 415. The LTE band 1 may be a next highest priority LTE band based on the timing parameter. Thus, the LTE band 1 may be the fourth UE RFB in the order 415. Finally, the LTE band 13 may be a neighbor LTE band to the LTE band 1. Accordingly, the LTE band 13 may be the fifth UE RFB in the order 415.

For exemplary purposes, the table 400 may relate to when the provider utilizes 13 different LTE bands. However, those skilled in the art will understand that the provider may utilize any number of LTE bands. Those skilled in the art will understand the manner in which the exemplary embodiments are to be modified to accommodate more or less different LTE bands that are available. It should also be noted that the use of a table to store the various CA combinations is only exemplary. The UE 105 may store the CA combinations in any manner.

Based on the UE RFBs 410 having the order 415, the table 400 may be determined which illustrates the CA combination priority 420. The CA combination priority 420 may be read from left to right and top to bottom as highest to lowest priority. The CA combination priority 420 may be arranged such that a full set of CA combinations are listed for a selected PCC. As described above, the CA combinations may be prioritized using the first mechanism by initially selecting the highest priority UE RFB as the PCC. Thus, the first selected PCC 425 is the LTE band 7.

Using the first selected PCC 425 as the LTE band 7, the table 400 illustrates the full set of prioritized CA combinations. As described above, a first prioritized set of CA combinations 430 may be the quadruple CA combinations where the highest priority UE RFB is the PCC and any UE RFBs are used as the SCCs. For example, the CA combination of LTE band 7 (PCC) and LTE bands 4, 12 and 1 (SCCs) may be the highest priority CA quadruple combination, followed by LTE band 7 (PCC) with LTE bands 4, 12 and 13 (SCCs), LTE band 7 (PCC) with LTE bands 4, 1 and 13 (SCCs), and LTE band 7 (PCC) with LTE bands 12, 1 and 13 (SCCs). A second prioritized set of CA combinations 435 may be the triple CA combinations where the highest priority UE RFB is the PCC and any UE RFBs are used as the SCCs. For example, the CA combination of LTE band 7 (PCC) and LTE bands 4 and 12 (SCCs) may be the highest priority CA combination in this set, followed by LTE band 7 (PCC) with LTE bands 4 and 1 (SCCs), LTE band 7 (PCC) with LTE bands 4 and 13 (SCCs), etc. A third prioritized set of CA combinations 440 may be the double CA combinations where the highest priority UE RFB is the PCC and any UE RFB is used as the SCC. For example, the CA combination of LTE band 7 (PCC) and LTE band 4 (SCC) may be the highest priority CA combination, followed by LTE band 7 (PCC) with LTE band 12 (SCC), LTE band 7 (PCC) with LTE band 1 (SCC), and LTE band 7 (PCC) with LTE band 13 (SCC).

A fourth prioritized set of CA combinations 445 may be the quadruple CA combinations where the highest priority UE RFB is the PCC and any other LTE bands (non-UE RFB) are used as the SCCs. For example, the quadruple CA combination of LTE band 7 (PCC) with combinations of LTE bands 2, 3, 5, 6, 8, 9, 10, and 11 (SCCs) may be listed herein. It should be noted that due to space constraints in the figure, not all of the quadruple CA combinations are listed in box 445. Those skilled in the art will understand the remaining possible quadruple CA combinations that are not specifically listed. A fifth prioritized set of CA combinations 450 may be the triple CA combinations where the highest priority UE RFB is the PCC and any other LTE bands (non-UE RFB) are used as the SCCs. For example, the triple CA combination of LTE band 7 (PCC) with combinations of LTE bands 2, 3, 5, 6, 8, 9, 10, and 11 (SCCs) may be listed herein. A sixth prioritized set of CA combinations 455 may be the double CA combinations where the highest priority UE RFB is the PCC and any other LTE band (non-UE RFB) is used as the SCC. For example, the CA combination of LTE band 7 with LTE bands 2, 3, 5, 6, 8, 9, 10, and 11 may be listed herein. In this manner, the CA combinations for the LTE band 7 may be listed.

The table 400 further illustrates more CA combinations based on the order 415 of the UE RFB priority 410. As the CA combinations are prioritized using the first mechanism, the second selected PCC 460 is the LTE band 4. Thus, the set of CA combinations 465 may list the quadruple CA combinations where the LTE band 4 is the PCC and the other UE RFBs are the SCCs. The set of CA combinations 470 may list the triple CA combinations where the LTE band 4 is the PCC and the other UE RFBs are the SCCs. The set of CA combinations 475 may list the double CA combinations where the LTE band 4 is the PCC and one of the other UE RFBs is the SCC. The set of combinations 480 may list the quadruple CA combinations where the LTE band 4 is the PCC and the other LTE bands (non-UE RFBs) are the SCCs. The set of combinations 485 may list the triple CA combinations where the LTE band 4 is the PCC and the other LTE bands are the SCCs. The set of combinations 490 may list the double CA combinations where the LTE band 4 is the PCC and one of the other LTE bands (non-UE RFBs) is the SCC.

The table 400 may continue to be created where the next UE RFB in the order 415 is selected to determine the CA combinations. Thus, the third selected PCC is the LTE band 12. The table 400 may list the CA combinations for the LTE band 12 as the PCC in the same manner as was described above for the LTE bands 7 and 4. Similarly, the same process may be repeated for the remaining UE RFB bands 1 and 13 to complete the table 400.

It is also noted that the UE 105 that utilizes the table 400 may be capable of utilizing all of the LTE bands and CA combinations thereof. Thus, the above description for the different CA combinations lists each possible combination. However, those skilled in the art will understand that the UE 105 may not be capable of supporting selected LTE bands and/or selected CA combinations. For example, if the LTE bands 8, 9, and 10 are not supported by the UE 105, the table 400 may have a different set of CA combinations 445, 450, 455, 480, 485, 490, in which any CA combination that includes any of the LTE bands 8, 9, and 10 are removed. In another example, the UE 105 may have been notified that a select LTE band (e.g., LTE band 4) may be unavailable for any number of reasons. Accordingly, the table 400 may be updated in which the set of CA combinations 430, 435, 440, remove any CA combination that includes the LTE band 4 while the set of CA combinations 465-490 are entirely removed as the selected PCC 460 is the LTE band 4.

The exemplary embodiments utilizing the prioritization of the first mechanism may be implemented for further conditions and scenarios. As described above, the first mechanism may be utilized generally for advertising a capability of using LTE bands for the CA functionality. The advertising using the first mechanism of the exemplary embodiments may be further refined when certain network conditions or events have been detected. That is, the first mechanism of the exemplary embodiments may utilize a more selective manner of advertising the UE RFBs.

In a first example, when the UE 105 detects poor network conditions (e.g., the UE 105 is closer to an edge of the network, a relatively low received signal strength indicator (RSSI) value as compared to a threshold is determined, etc.), the UE 105 may restrict the advertisement of CA combinations to only those UE RFBs present in the order 415. That is, the table 400 may be updated when the poor network conditions are detected to remove the sets of CA combinations including non-UE RFBs such as the set of CA combinations 445, 450, 455, 480, 485, 490. In this manner, the sets of CA combinations that include only UE RFBs may be utilized.

In a second example, when the UE 105 detects that a registration procedure on a particular network is consistently failing, the UE 105 may restrict the advertisement of CA combinations to only those UE RFBs present in the order 415. For example, the registration procedure may fail due to a relatively large size UE capability message (e.g., inclusion of all CA combinations in the UE capability message may increase the size of the UE capability message). Thus, in a substantially similar manner as the first example described above, the sets of CA combinations that include only UE RFBs may be utilized.

As noted above, the exemplary embodiments may provide a second mechanism related to performing measurements as requested by the network. For example, when the UE 105 indicates a CA capability, the network may track optimal LTE bands to utilize for the CA functionality. To determine the quality of the LTE bands for the UE 105, the UE 105 may utilize the transceiver 120 to tune to the requested LTE band and perform measurements. The measurements may then be transmitted to the network for consideration in the CA functionality.

Those skilled in the art will understand that there may be two approaches to performing the measurements: gap measurements and gapless measurements (GM). In a gap measurement, the UE 105 may utilize the transceiver 105 to tune away from a first LTE band, tune to a second LTE band requested by the network, perform the measurements on the second LTE band, and then tune back to the first LTE band. However, this places a gap in the connection using the first LTE band during the time the transceiver 105 tunes to the second LTE band to perform the measurements. Although the probability may be minimized, there still may be lost opportunities to miss data being transmitted over the first LTE band during this gap time.

In a GM, the transceiver 120 of the UE 105 may be a multi-transceiver. That is, the transceiver 120 may be capable of tuning to a plurality of LTE bands concurrently. Thus, the UE 105 may utilize a first portion of the transceiver 105 to tune to a first LTE band. The network may request that measurements be performed for a second LTE band. If available, a second portion of the transceiver 105 may be used to tune to the second LTE band while the first portion remains tuned to the first LTE band. The second portion may therefore be used to perform the measurements. In this manner, there is no gap in the connection using the first LTE band and data transmitted during the time that the measurements are performed in the second LTE band may still be received over the first LTE band. However, those skilled in the art will understand that the use of GMs requires more power as the transceiver 105 is being utilized in a more complex manner. Furthermore, even with the transceiver 120 being a multi-transceiver, the GM may still be unavailable. For example, the UE 105 may be CA capable and the CA functionality may be utilized such that the first portion of the transceiver 120 is being used for a first LTE band (e.g., PCC) and the second portion of the transceiver 120 is being used for a second LTE band (e.g., SCC). The network may request that a measurement be made for a third LTE band. In such a scenario, the UE 105 may be incapable of performing a GM as there may not be a spare portion of the transceiver 120 that can tune to the third LTE band without tuning away from the first LTE band or the second LTE band.

The GM may be another capability of the UE 105 that is advertised to the network. Under conventional operations, when requested, the UE 105 transmits a data packet indicating the capabilities of the UE 105. For example, the data packet may be limited to various sizes, such as between 800 to 1,200 bytes, 1,000 to 1,500 bytes or up to 2,500 bytes. With the UE 105 being CA capable, a significant portion of the data packet may be occupied with the CA combination advertisement that was described in detail above. A further capability that is included in the data packet are the GM capabilities. Using the conventional operations, even when GMs cannot be performed, the data packet still includes GMs that are not supported. For example, a zero value may be included for a particular GM that is not supported.

Those skilled in the art will understand that there are a variety of different types of GMs. In a first example, the GM may be related to inter-frequency (IF) gapless measurements (IF GMs) for individual LTE bands. In a second example, the GMs may be related to inter-RAT (IR) gapless measurements (IR GMs) for individual LTE bands. In a third example, the GMs may be related to IF GMs for each CA combination. In a fourth example, the GMs may be related to IR GMs for each CA combination.

With these multiple types of GMs, it is evident how the data packet for the UE capability may also be occupied in a significant manner by the GM capabilities. In a specific example, the data packet may be limited to 1,184 bytes. In this example, there may be 13 total LTE bands that are supported. There may also be 6 total UTRA bands that are supported, 6 total 1× bands that are supported, and 4 total GERAN bands that are supported. Accordingly, there may be 16 total non-LTE bands that are supported. There may also be 79 CA combinations that are supported by the UE 105. Thus, in this example, the IF GMs for individual LTE bands may occupy 169 bits (13×13); the IR GMs for individual LTE bands may occupy 208 bits (13×16); the IF GMs for CA combinations may occupy 1,027 bits (79×13); and the IR GMs for CA combinations may occupy 1,264 bits (79×16). Using the size of each GM and other information to be included, the GM portion to be included in the data packet may be 333.5 bytes. This occupies approximately 28% of the data packet size.

When the data packet for the UE capability information increases in size, particularly since all of the GMs are included in the data packet whether or not the GMs are actually performed, various issues may arise from this large size. For example, a legacy eNB may be incapable of handling a data packet greater than 500 bytes which leads to the data packet dropping and further leading to attach failures. In another example, the network may not provide enough of an uplink grant to the UE 105 to send the complete data packet which leads to network timeouts and further eventually leading to attach failures.

The exemplary embodiments provide a second mechanism in which a preliminary operation is performed prior to creating and transmitting the data packet indicating the capability of the UE 105. The preliminary operation may introduce an indicator for a specific type of GM that allows for the performance of the GM to be truly optional. If the option is exercised not to perform the GMs for the specific type, the corresponding GMs may be omitted from inclusion in the data packet, which results in a decrease of the overall size of the data packet.

As described above, the processor 110 of the UE 105 may execute a GM application 127 that is configured to set indicators for different types of GMs that the UE is currently configured to perform. Again, examples of the types of GMs may include the IF GMs for individual LTE bands, the IR GMs for individual LTE bands, the IF GMs for CA combinations, and the IR GMs for CA combinations. The GM application 127 may be configured to determine whether the UE 105 is not capable of performing any of these GMs. The GM application 127 may generate an indicator for each of these types of GMs such that the GM application 127 may set the indicator as capable or incapable of performing the corresponding GMs. In a specific implementation, the indicator may be a Boolean signal. Thus, the network may receive the indicators and if any indicator indicates the UE 105 is not capable of performing a particular type of GM, the network may be aware that a subsequent data packet of UE capability may omit the portion associated with the identified type of GM. Thus, only the GMs whose indicators indicate a positive capability will have GMs advertised from the UE 105 to the network.

Figure 5:
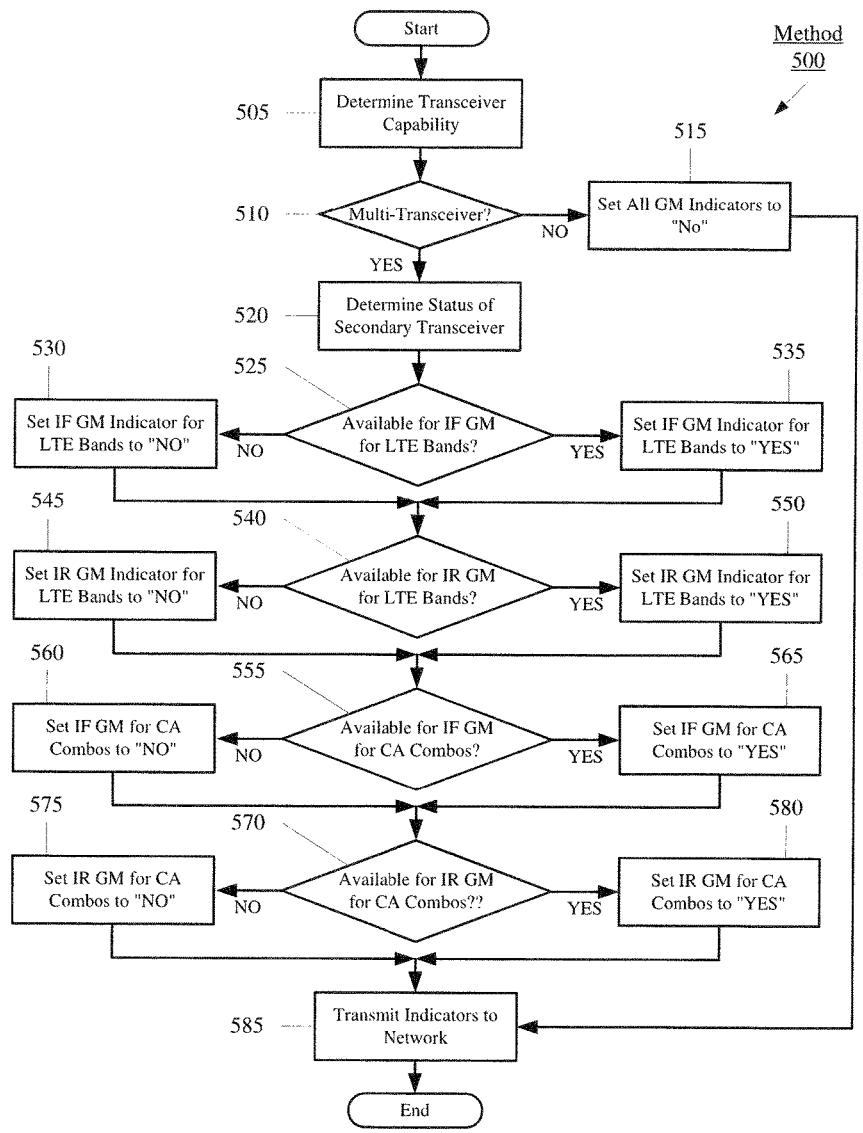
FIG. 5 shows a method for generating indicators associated with a gapless measurement according to various exemplary embodiments described herein.

FIG. 5 shows a method 500 for generating indicators associated with a gapless measurement according to the exemplary embodiments. The method 500 may relate to the second mechanism of the exemplary embodiments in which the UE 105 sets indicators for the different types of gapless measurements that are performed by the UE 105, where the indicators indicate whether the gapless measurement is capable of being performed. As discussed above, the use of the indicators may be a feature that is supported by the PCell and performed by the UE 105. Thus, the method 500 is performed by the UE 105 and the method 500 will be described with regard to the system 100 of FIG. 1.

In 505, the UE 105 determines a capability of the transceiver 120. Specifically, in 510, the UE 105 determines whether the transceiver 120 is a multi-transceiver. If the transceiver 120 is not a multi-transceiver, it may be assumed that a gapless measurement is incapable of ever being performed. Thus, in 515, the UE 105 may set all indicators for the different types of GMs as not capable of being performed (e.g., a value of 0). The UE 105 may continue the method 500 to 585 in which the indicators are transmitted to the network. As all types of GMs are not performed, any subsequent data packets indicating the UE capability may omit all the data related to GMs.

If the transceiver 120 is a multi-transceiver, GMs may be possible. For purposes of describing the method 500, the transceiver 120 may be assumed to have a primary transceiver which is used for the PCell and at least one secondary transceiver which is used for any SCell or GM. Thus, in 520, the status of the secondary transceiver is determined.

In 525, the UE 105 determines whether the secondary transceiver is available for IF GMs for individual LTE bands. If the UE 105 determines that the secondary transceiver is not available, in 530, the indicator for IF GMs for individual LTE bands may be set to not capable. If the UE 105 determines that the secondary transceiver is available, in 535, the indicator for IF GMs for individual LTE bands may be set to capable.

In 540, the UE 105 determines whether the secondary transceiver is available for IR GMs for individual LTE bands. If the UE 105 determines that the secondary transceiver is not available, in 545, the indicator for IR GMs for individual LTE bands may be set to not capable. If the UE 105 determines that the secondary transceiver is available, in 550, the indicator for IR GMs for individual LTE bands may be set to capable.

In 555, the UE 105 determines whether the secondary transceiver is available for IF GMs for CA combinations. If the UE 105 determines that the secondary transceiver is not available, in 560, the indicator for IF GMs for CA combinations may be set to not capable. If the UE 105 determines that the secondary transceiver is available, in 565, the indicator for IF GMs for CA combinations may be set to capable.

In 570, the UE 105 determines whether the secondary transceiver is available for IR GMs for CA combinations. If the UE 105 determines that the secondary transceiver is not available, in 575, the indicator for IR GMs for CA combinations may be set to not capable. If the UE 105 determines that the secondary transceiver is available, in 580, the indicator for IR GMs for CA combinations may be set to capable.

Subsequently, based on the different indicators determined for the IF GMs for individual LTE bands, the IR GMs for individual LTE bands, the IF GMs for CA combinations, and the IR GMs for CA combinations, in 585, the UE 105 transmits the indicators to the network. Thus, the UE 105 has indicated to the network a capability to perform only the GMs for the identified types whose indicator is labeled as capable for inclusion in the subsequent data packets for the capability of the UE 105.

The exemplary embodiments provide a device, system, and method of advertising network capability of a UE. In a first mechanism, for a UE that is CA capable, the CA combinations may be advertised such that the UE may select the CA combinations of highest relevance to the UE to be advertised while lower relevance CA combinations may be advertised only if available in the limited advertisement space. In a second mechanism, a transceiver of the UE is determined to be capable of incapable of performing GMs of different types such that indicators of the capability are initially transmitted to the network to indicate whether a data packet of UE capability is to include the GMs of the different types.

It should be noted that the above exemplary embodiments were generally described with respect to the operation of an LTE network. However, it should be noted that the exemplary embodiments may also be used with respect to any networks that advertise or implement CA or GMs, including networks that have yet to deployed such as 5G networks.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a user equipment:
   determining a number of available spots to advertise carrier aggregation (CA) combinations to a network;
   determining a priority order for a plurality of bands that are part of the CA combinations;
   determining a list of the CA combinations based on the priority order; and
   transmitting a portion of the list of the CA combinations in the priority order to the network, wherein the portion corresponds to the number of available spots.

2. The method of claim 1, wherein determining the priority order, comprises:
   determining a timing parameter for each of the bands based on how recent the user equipment was camped on each of the bands, wherein priority is given to the bands that have been most recently camped on.

3. The method of claim 2, wherein determining the priority order, further comprises:

determining a neighbor band for each of the bands that have been determined to have priority based on the timing parameter.

4. The method of claim 3, wherein the CA combinations include one of all bands available to the UE or only bands that have been determined to have priority based on the timing parameter and the neighbor bands.

5. The method of claim 1, wherein determining the priority order is based on a number of component carriers used for the CA combinations.

6. The method of claim 5, wherein the number of component carriers is one of four component carriers, three component carriers or two components carriers.

7. The method of claim 1, wherein the plurality of bands are Long Term Evolution (LTE) bands.

8. The method of claim 1, wherein the portion of the list is the entire list when a number of CA combinations is less than the number of available spots.

9. The method of claim 1, further comprising:
receiving a second list of CA combinations from the network; and
adding the CA combinations on the second list to the list of CA combinations, wherein the CA combinations on the second list have a highest priority.

10. The method of claim 1, wherein the list is location dependent and the user equipment determines a further list of CA combinations based on the user equipment being disposed in a different location from a location where the list of CA combinations was determined.

11. A user equipment, comprising:
a transceiver configured to connect the user equipment to a network, the user equipment and the network configured for a carrier aggregation (CA) functionality; and
a processor determining a number of available spots to advertise CA combinations to the network, the processor determining a priority order for a plurality of Long Term Evolution (LTE) bands that are part of the CA combinations, the processor determining a list of the CA combinations based on the priority order,
wherein the transceiver transmits a portion of the list of the CA combinations in the priority order to the network, wherein the portion corresponds to the number of available spots.

12. The user equipment of claim 11, wherein the processor determines the priority order by determining a timing parameter for each of the LTE bands based on how recent the user equipment was camped on each of the LTE bands, wherein priority is given to the LTE bands that have been most recently camped on.

13. The user equipment of claim 12, wherein the processor further determines the priority order by determining a neighbor LTE band for each of the LTE bands that have been determined to have priority based on the timing parameter.

14. The user equipment of claim 13, wherein the CA combinations include one of all LTE bands available to the UE or only LTE bands that have been determined to have priority based on the timing parameter and the neighbor bands.

15. The user equipment of claim 13, wherein when the processor determines that the user equipment is one of near an edge of the network, has a received signal strength indicator (RSSI) value that is lower than a threshold or that a registration procedure for the network has failed a number of times greater than a threshold, the processor includes only bands that have been determined to have priority based on the timing parameter and the neighbor bands in the list of CA combinations.

16. The user equipment of claim 11, wherein the processor determines the priority order based on a number of component carriers used for the CA combinations.

17. The user equipment of claim 11, wherein the user equipment receives a second list of CA combinations from the network and the processor adds the CA combinations on the second list to the list of CA combinations, wherein the CA combinations on the second list have a highest priority.

18. An integrated circuit, comprising:
circuitry configured to determine a number of available spots to advertise carrier aggregation (CA) combinations to a network;
circuitry configured to determine a priority order for a plurality of bands that are part of the CA combinations;
circuitry configured to determine a list of the CA combinations based on the priority order; and
circuitry to determine a portion of the list of the CA combinations in the priority order that is to be transmitted to the network, wherein the portion corresponds to the number of available spots.

19. The integrated circuit of claim 18, wherein the circuitry configured to determine the priority order comprises:
circuitry configured to determine a timing parameter for each of the bands based on how recent the user equipment was camped on each of the bands, wherein priority is given to the bands that have been most recently camped on.

20. The integrated circuit of claim 19, wherein the circuitry configured to determine the priority order further comprises:
circuitry configured to determine a neighbor band for each of the bands that have been determined to have priority based on the timing parameter.

* * * * *